United States Patent [19]

Kawaguchi et al.

[11] 4,163,826
[45] Aug. 7, 1979

[54] SELF-BONDING MAGNET WIRES AND COILS MADE THEREFROM

[75] Inventors: Munetaka Kawaguchi; Masayoshi Miyake, both of Nagoya, Japan

[73] Assignee: Sumitomo Electric Industries, Ltd., Osaka, Japan

[21] Appl. No.: 881,940

[22] Filed: Feb. 28, 1978

[30] Foreign Application Priority Data

Feb. 28, 1977 [JP] Japan .................. 52/21844

[51] Int. Cl.² .......................... H01B 3/30; H01F 5/06
[52] U.S. Cl. .................................. 428/371; 335/299;
427/116; 427/117; 427/118; 428/377; 428/383;
428/900; 428/474; 174/110 N; 174/120 SR
[58] Field of Search ............... 428/371, 383, 474, 458,
428/377, 900, 474 N, 474 R; 427/117, 118, 116;
174/120 SR, 110 N; 335/213, 299

[56] References Cited

U.S. PATENT DOCUMENTS 3,220,882  11/1965  Lavin .................................. 428/383
3,300,843  1/1967   Umewaka ........................... 427/118
3,446,660  5/1969   Pendleton .......................... 428/384
3,516,858  6/1970   Fitzhugh ............................ 428/383
3,632,400  1/1972   Burlant .............................. 428/422
3,762,986  10/1973  Bhuta ................................ 428/474
3,906,139  9/1975   Hiraoka ............................. 428/383
3,922,465  11/1975  Kawaguchi ........................ 428/383
3,975,571  8/1976   Kawaguchi ........................ 428/371

Primary Examiner—Ellis P. Robinson
Attorney, Agent, or Firm—Sughrue, Rothwell, Mion, Zinn and Macpeak

[57] ABSTRACT

A self-bonding magnet wire suitable for use in making coils, especially deflection yoke coils for television, obtained by coating and baking on a bare conductor or an insulated wire conductor an enamel comprising a polymer solution prepared by reacting two or more copolyamides, at least one of which is a copolyamide containing a nylon-12 unit in the molecule thereof, under heating in a solvent containing at least one compound with a phenolic hydroxyl group in the molecule thereof.

16 Claims, 5 Drawing Figures

SELF-BONDING MAGNET WIRES AND COILS MADE THEREFROM

BACKGROUND OF THE INVENTION

1. Field of the Invention

This invention relates to a self-bonding magnet wire.

2. Description of the Prior Art

In recent years, users have increasingly demanded self-bonding magnet wires as windings which can permit the omission of or simplification of a varnish-impregnating step in the production of electric machinery and appliances to solve the problem of environmental pollution and the problem of safety and sanitation in working areas, and which can contribute to a shortening in the manufacturing process and a reduction in the cost of production.

Self-bonding magnet wires are used as deflection yoke coils for television sets, and also have various other applications, for example, in various transformers, speakers and motors. As a result, it has been desired to develop materials having various characteristics which conform to the manufacturing processes, the treatment conditions and the service conditions established by the individual users.

Investigation of the chemical nature of materials and the blending of various materials would be a first approach in exploring materials which meet the various requirements of users. However, since the quantities of materials for self-bonding magnet wires are very small as compared with various common plastics, even if a preferred chemical composition exists, it is uneconomical, and in many cases, virtually impossible, to produce a new material only for that use. The general practice, therefore, is to develop materials meeting the required characteristics by blending various commercially available materials which have other uses.

Polymers, however, are frequently difficult to blend because their compatibility or miscibility is unsatisfactory. Moreover, since commercially available polymers have high molecular weights and high solution viscosities, a large amount of solvent must be used, and this often is economically disadvantageous.

Deflection coils for television sets, which are now in use, are produced by winding a self-bonding magnet wire in a yoke coil form with an automatic winder, and pressing and electrically heating the coil to bond the bonding layer on the outside of the insulation coating on the wound wire and to form a yoke coil. Polyvinyl butyral is one example of the materials heretofore used as a bonding layer of a self-bonding magnet wire.

Since the angle of deflection of deflection yoke coils for television has been increased in recent years, a yoke coil must have reduced deformation on heating, and retain its adhesiveness even at high temperatures of, for example, about 130° C. Conventional self-bonding magnet wires using polyvinyl butyral as a bonding layer have the defect that their thermal properties are poor, and thus the requirements described above cannot be met by using polyvinyl butyral.

In an attempt to remove this defect, the addition of a thermosetting resin such as a polyester resin, an epoxy resin or a phenolic resin or a combination of such a thermosetting resin and a blocked isocyanate as a curing agent has been a technique which has been employed. If a small amount of such a thermosetting resin is added, the effect of improving the thermal characteristics is small. If the amount is increased in an attempt to greatly improve the thermal characteristics, the inherent defects of thermosetting resins appear. Specifically, thermosetting enamels are sensitive to the baking conditions employed. If the baking is insufficient, the flexibility of the coated film is reduced markedly. If, on the other hand, the baking is excessive, the bondability of the film is lost or the film requires very high bonding temperatures. Hence, it is difficult to produce products with consistent quality.

In order to meet the requirements described above, polyamide resins have been extensively studied as bonding resins of self-bonding magnet wires for deflection coils. When homopolyamides such as nylon-6 or nylon-6,6 are used, their bonding temperatures are too high because of their high melting points. Bonding at such high temperatures not only accelerates the heat deterioration of the polyamide resins, but also adversely affects the insulation film in an underlayer present. Nylon-12 which has the lowest melting point among homopolyamide resins now commercially produced still has too high a bonding temperature. In order to permit bonding at lower temperatures than those possible with nylon-12 and to retain high adhesiveness at high temperatures of, for example, 130° C., a method was employed of blending two types of copolyamides, as described in Japanese Patent Application (OPI) No. 49488/76. Where a mere blend of two or more copolyamides is used, if the proportion of one copolyamide is larger than those of the other copolyamide(s) the resin film obtained by coating and baking the blend has a comparatively good appearance. However, if the proportions of the copolyamides are about the same, the resin after coating and baking forms a non-uniform film, and the resulting wire insulation has a very good appearance with the formation of raised and depressed portions, peeling, cloudiness or non-uniform or uneven colors. Consequently, the wire tends to deteriorate during winding, and the coil obtained by winding has a poor space factor with the spaces between the wires being too large. Moreover, the flow of the resin is poor and the resin does not bond sufficiently. In particular, the shape of coils cannot be firmly maintained in deflection coils for television sets, and a problem of color shearing occurs. Hence, the wire is not practical as a self-bonding magnet wire.

Such an enamel is a uniform clear solution, and the resin film obtained as a self-bonding layer is very thin. It has been found that when the enamel is coated and baked on a transparent material such as a glass sheet, the resulting resin film is non-uniform and non-transparent and depressed and raised portions and peeling are formed because of the lack of miscibility of the constituent components used. This is not clearly seen with conductors such as copper or aluminum because they are opaque to light. Thus, it has been found that when a enamel composed of a solution of a mere blend of copolyamides is used, the formation of raised and depressed portions and peeling on the film of the resulting self-bonding magnet wire is due to the poor miscibility of the resins in the film obtained by baking the enamel. Furthermore, since an enamel composed of a mere solution of at least two copolyamides in a solvent has a high viscosity and a low concentration, large amounts of solvent and thinner must be used. This is not only uneconomical, but also decreases the coatability of the enamel.

SUMMARY OF THE INVENTION

Extensive investigations were made in an attempt to remove these defects described above and they have led to the discovery that by coating and baking an enamel comprising a polymer solution obtained by reacting two or more copolyamides, at least one of which is a copolyamide having a nylon-12 unit in the molecule thereof, under heating in a solvent containing at least one compound having a phenolic hydroxyl group in the molecule thereof, that a self-bonding magnet wire can be obtained where the self-bonding layer thereof has good resin miscibility, is uniform and transparent, and does not result in the formation of raised and depressed portions, peeling or specks; that consequently, no appreciable deterioration the insulated wire occurs during processing, and the coil obtained by winding does not have spaces among the wires and has a good space factor; that the flow of the resins is uniform and after bonding, the bond-ability of the self-bondable resin extends to every part of the coil in a complicated shape such as in deflection coils for television sets, with the result that color shearing and poor focusing do not occur; and that bonding of the self-bonding layer is possible at desirable low temperatures, and the bond strength can be retained at high temperatures (of, for example, about 130° C.) without adversely affecting the desirable properties of the polyamide resins, such as toughness, abrasion resistance and chemical resistance, thus providing a self-bonding magnet wire having a very high utilitarian value.

It has also been found that the insulation enamel obtained by this invention is economical and has superior coatability because the enamel has a low viscosity and the concentration in the enamel can be increased.

Thus, in one embodiment, the present invention provides a self-bonding magnet wire comprising an electrical conductor having directly thereon or on another electrically insulating layer thereon a coated and baked layer of an enamel comprising a solution of a polymer comprising the reaction product obtained on heating two or more copolyamides, at least one of which is a copolyamide having a nylon-12 unit in the molecule thereof, in a solvent containing at least one compound with a phenolic hydroxyl group in the molecule thereof.

The invention, in another embodiment, provides a coil of the self-bonding magnet wire described above.

BRIEF DESCRIPTION OF THE ACCOMPANYING DRAWINGS

Figure 4:
Figure 5:
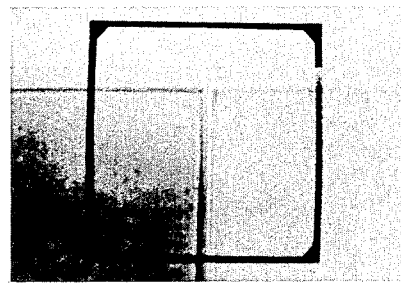

FIG. 4 is a photograph (magnification 60×) of the surface of the self-bonding magnet wires produced in Comparative Example 2; and FIG. 5 is a photograph of glass plates on which the enamels used in Example 2 and Comparative Example 2 were coated and baked, the glass plate on the left-hand side of the photograph being the glass plate on which the enamel of Example 2 was coated and baked and the glass plate on the right-hand side of the photograph being the glass plate on which the enamel of Comparative Example 2 was coated and baked.

DETAILED DESCRIPTION OF THE INVENTION

Examples of copolyamides containing a nylon-12 unit (i.e., $-[(CH_2)_{11}COHN]-$ which is a recurring unit making up nylon-12) are copolymers of nylon-12 with the monomer components of nylon-6, nylon-6,10, nylon-6,6 and nylon-11, with nylon-6 having therein a recurring unit of $-[(CH_2)_5CONH]-$, nylon-6,10 having therein a recurring unit of $-[(CH_2)_6NHCO-(CH_2)_8CONH]-$, nylon-6,6 having therein a recurring unit of $-[(CH_2)_6NHCO-(CH_2)_4CONH]-$, and nylon-11 having therein a recurring unit of $-[(CH_2)_{10}CONH]-$. Preferred copolyamides are a copolyamide of nylon-12 and nylon-6, a copolyamide of nylon-12, nylon-6 and nylon-6,6 and a copolyamide of nylon-12, nylon-6 and nylon-6,10. The proportion of the nylon-12 component of the copolyamide is preferably about 20 to about 90% by weight, more preferably 25 to 85% by weight. The weight percent of the nylon-12 component expresses the weight percent of $-[(CH_2)_{11}CONH]_{\overline{n}}$ based on the entire molecular weight in a copolyamide of nylon-12 and nylon-6, $[(CH_2)_{11}CONH]_{\overline{n}}$ $[(CH_2)_5COHN]_{\overline{m}}$, for example.

Copolyamides other than those containing a nylon-12 unit in the molecules thereof are copolymers of two or more of the monomer components (not containing a monomer of nylon-12) of nylon-6, nylon-6,6, nylon-6,10 and nylon-11, for example. A copolyamide of nylon-6, nylon-6,6 and nylon-6,10 is preferred.

The effect of the present invention appears most conspicuously when the amount of a copolyamide present in the largest proportion of the two or more copolyamides used in this invention is about 90% by weight or less, preferably 70% by weight or less. For example, when two copolyamides are used in this invention, the proportion of one of the copolyamides to the total amount of the copolyamides is preferably about 90 to about 10% by weight, more preferably 80 to 20% by weight, and most preferably 70 to 30% by weight.

Preferred combinations of the two or more copolyamides used in this invention are those composed of copolyamides in which all contain a nylon-12 unit in the molecules thereof. Of these, a combination of a copolyamide of nylon-12 and nylon-6 with a copolyamide of nylon-12, nylon-6 and nylon-6,6, or a copolyamide of nylon-12, nylon-6 and nylon-6,10 is preferred.

The compound containing a phenolic hydroxyl group in the molecule thereof is used in this invention as a solvent. Preferred monohydric phenols which can be used in this invention are represented by the general formula (I)

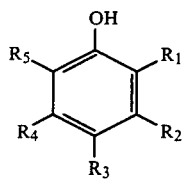

wherein $R_1$, $R_2$, $R_3$, $R_4$ and $R_5$, which may be the same or different, each represents a hydrogen atom or an alkyl group having 1 to 4 carbon atoms, e.g., a methyl group, an ethyl group, a butyl group, etc. Specific examples of compounds containing a phenolic hydroxyl group which can be used in this invention include phenol, o-cresol, m-cresol, p-cresol, 2,3-xylenol, 2,4-xylenol, 2,5-xylenol, 3,4-xylenol, and 3,5-xylenol. These compounds may be used alone or as mixtures thereof. It is not necessary to use pure grades of these compounds, and for economical reasons, the use of commercially available grades containing water and other impurities is preferred.

The polymer solution per se can be used as an enamel, if desired. The solvents which can be used in combination with the compound containing a phenolic hydroxyl group serves to control the viscosity or concentration of enamels.

Example of solvents, which can be used in combination with the compound containing a phenolic hydroxyl group at the outset or during the reaction, or as diluents for controlling the viscosity or concentration of enamels, include aromatic hydrocarbons such as xylene, ethylbenzene, or solvent naphtha, esters such as amyl acetate or butyl acetate, derivatives of polyhydric alcohols such as Cellosolve acetate, ethyl Cellosolve or butyl Cellosolve, and alcohols such as 2-ethylhexanol, diethylene glycol or methyl carbitol.

In performing the reaction under heat, at least two copolyamides and the compound containing a phenolic hydroxyl group may be added in any sequence; for example, the addition may be simultaneous, or successive in portions. In any case, it is only necessary for at least a part of the compound containing a phenolic hydroxyl group to be present from the outset of the reaction.

The end point of the reaction can be determined by comparing the transparency and uniformity of a resin film obtained by baking the enamel with those of a resin film obtained by blending the same proportions of the copolyamides used in the reaction and merely dissolving the blend of the copolyamides used in a solvent. Most preferably, the heat reaction is carried out until the resin film obtained by baking the enamel resulting from the heat reaction is completely transparent and uniform. For practical purposes, the reaction is carried out until the transparency and uniformity of the resin film obtained by baking the resulting enamel are improved sufficiently as compared with the resin film obtained from the mere blend.

The temperature of the reaction is at least about 120° C., preferably at least 150° C., in order to reduce the cost of production in commercial operations and to shorten the reaction time. In actual operation, it is economical and preferable to perform the reaction at the refluxing temperature of the reaction system or at a temperature near the refluxing temperature because this results in the shortest reaction time. Where the reaction equipment has a limit on temperatures which can be used, however, the use of such high temperatures is impossible and lower temperatures are suitable.

It is possible to improve the various characteristics of the coils produced, such as their tendency to deform upon heating or upon moisture absorption, by adding at least one of a thermoplastic resin such as a phenoxy resin, a polyvinyl butyral resin, a polysulfone resin or a polyester resin, a thermosetting resin such as a phenolic resin (phenol-formaldehyde resin), a melamine resin, a urea resin or an epoxy resin, or a blocked isocyanate to the polymer solution obtained by the heat reaction. Furthermore, the characteristics of wires can be improved by adding one or more plasticizers, silicones, surface active agents, pigments, dyes, organic fillers, inorganic fillers, etc. to the polymer solution. The use of these materials is also within the scope of the present invention.

Since the self-bonding magnet wire of this invention can be bonded at relatively low temperatures, e.g., about 150° C., even if conventional materials such as polyurethanes, polyvinyl formals or polyesters are used as an electrical insulation layer on the conductor, there is no likelihood of a great degree of deterioration in the characteristics by heating during bonding. A superior effect is obtained, however, when the electrical insulation layer is composed of one or more thermally stable materials such as polyesterimides, polyesterimideurethanes, polyesteramideimides, polyesteramideimideurethanes, polyhydantoinesterimides, polyhydantoinesteramideimides, polyhydantoins, polyamideimides, and polyimides. This provides a self-bonding magnet wire which has a high degree of reliability and which is free from detrioration during processing, layer short-circuiting and deterioration in characteristics by pressure-forming after high-speed winding, abrupt temperature increases due to electric heating, and cooling.

The following Examples are given to illustrate the present invention in more detail. It should be noted however that the invention is not to be construed as being limited to these specific Examples. Unless otherwise indicated herein, all parts percents, ratios and the like all by weight.

EXAMPLE 1

240 g of a Copolyamide (I) containing nylon-12 units and nylon-6 units (the weight ratio of the nylon-12 component to the nylon-6 component in the Copolyamide (I) was 8:2; hereinafter, the same) having a reduced specific viscosity of 1.71 ($\eta_{sp/c}$, m-cresol 0.5% solution, at 30° C.; hereinafter the same) and 160 g of a Copolyamide (II) of nylon-12 units, nylon-6 units and nylon-6,6 units (weight ratio: 1:1:1) having a reduced specific viscosity of 1.24 were reacted at 170° C. for 5 hours in 1200 g of a mixture of phenol and m-cresol (weight ratio: 2:8). The resulting polymer solution was diluted with 750 g of xylene to produce a uniform clear enamel having a concentration of 17% and a viscosity (measured using a B-type viscometer at 30° C.; hereinafter the same) of 1640 cps.

A polyesterimide electrical insulation enamel was coated and baked on a copper wire as an electrical conductor having a diameter of 0.5 mm in a conventional manner. The electrical insulation enamel prepared as above was coated and baked on the resulting polyesterimide electrical insulation coated wire to produce a self-bonding magnet wire. The resulting self-bonding magnet wire had a very good appearance with no imperfections such as raised and depressed portions, peeling or unevenness in color.

EXAMPLE 2

160 g of Copolyamide (I) and 240 g of Copolyamide (II) described in Example 1 were reacted at 190° C. for 3 hours in 1200 g of a mixture of m-cresol and p-cresol (weight ratio: 7:3). The resulting polymer solution was diluted with 750 g of solvent naphtha to produce an enamel having a concentration of 17% and a viscosity of 1370 cps. A self-bonding magnet wire was produced in the same manner as, in Example 1 using the resulting enamel. The wire obtained had a very good appearance with no imperfections such as raised and depressed portions, peeling or uneveness in color.

EXAMPLE 3 TO 5

Self-bonding magnet wires were produced in the same manner as in Example 1 except that the weight ratio of the Copolyamide (I) to Copolyamide (II) was changed to 30:70, 50:50, and 80:20, respectively. These self-bonding magnet wires had a very good appearance.

EXAMPLE 6

120 g of Copolyamide (III) of nylon-12 units and nylon-6 units (weight ratio: 7:3) and having a reduced specific viscosity of 1.68, and 120 g of Copolyamide (I) and 160 g of Copolyamide (II) described in Example 1 were reacted at 150° C. for 6 hours in 2100 g of a mixture of m-cresol, p-cresol and xylene (weight ratio: 3:4:3) to produce an enamel having a concentration of 16% and a viscosity of 1810 cps.

A polyesterimide electrical insulation enamel and a polyamideimide electrical insulation enamel were coated and baked on a copper wire as a conductor and having a diameter of 0.5 mm in a conventional manner to produce a polyesterimide overcoated with polyamideimide electrical insulation wire. The enamel prepared as described above was coated and baked on this electrical insulation wire to produce a self-bonding magnet wire having a superior appearance.

EXAMPLE 7

160 g of Copolyamide (I) and 160 g of Copolyamide (II) described in Example 1 were reacted at 180° C. for 2 hours in 1500 g of a mixture of m-cresol and mixed xylenes (weight ratio: 1:1). Then, 80 g of Copolyamide (IV) of nylon-6 units, nylon-6,6 units and nylon-6,10 units (weight ratio: 1:1:1) and having a reduced specific viscosity of 1.32 and 600 g of xylene were further added, and the reaction was continued at 130° C. for 6 hours to produce an enamel having a concentration of 16% and a viscosity of 1760 cps.

A self-bonding magnet wire having a superior appearance was produced in the same manner as in Example 6 using the resulting enamel.

EXAMPLE 8

200 g of Copolyamide (V) of nylon-12 units, nylon-6 units and nylon-6,10 units (weight ratio: 1:1:1) and having a reduced specific viscosity of 1.45 and 200 g of Copolyamide (III) described in Example 3 were reacted at 190° C. for 4 hours in 1200 g of a mixture of m-cresol and p-cresol (weight ratio: 4:6). The resulting polymer solution was diluted with 700 g of m-cresol and 600 g of Cellosolve acetate to produce an enamel having a concentration of 16% and a viscosity of 1160 cps. A self-bonding magnet wire having a very superior appearance was produced in the same manner as in Example 1 using the resulting enamel.

EXAMPLE 9

150 g of Copolyamide (I) described in Example 1 and 350 g of Copolyamide (IV) described in Example 4 were reacted at 190° C. for 5 hours in 1500 g of a mixture of m-cresol and p-cresol (weight ratio: 7:3) to produce a polymer solution having a concentration of 25%. The polymer solution was diluted with xylene to a concentration of 20%. The resulting enamel was coated and baked on a polyesterimide electrical insulation wire to produce a self-bonding magnet wire. The resulting self-bonding magnet wire had a very good appearance with no imperfections such as raised and depressed portions, peeling and unevenness in color.

EXAMPLES 10 AND 11

Self-bonding magnet wires were produced in the same manner as in Example 9 except that the weight ratio of Copolyamide (I) to Copolyamide (IV) was changed to 50:50, and to 70:30. These self-bonding magnet wires had a superior appearance.

Comparative Example 1

300 g of a polyvinyl butyral resin was dissolved in 1700 g of a mixture of m-cresol and p-cresol (weight ratio: 7:3) to form a polyvinyl butyral enamel having a concentration of 15%. The enamel was coated and baked in a conventional manner on a polyesterimide electrical insulation wire of copper as a conductor having a diameter of 0.5 mm to produce a self-bonding magnet wire.

Comparative Example 2

Copolyamide (I) and Copolyamide (II) described in Example 1 were mixed in a weight ratio of 40:60 and dissolved in a mixture of m-cresol, p-cresol and xylene (weight ratio: 4:2:4) at 80° C. to produce a uniform clear enamel having a concentration of 15% and a viscosity of 4,800 cps. A self-bonding magnet wire was produced in the same manner as in Example 1 using the resulting enamel.

Comparative Examples 3 to 5

Copolyamide (I) and Copolyamide (II) were mixed in a weight ratio of 30:70, 50:50 and 80:20 and dissolved in a mixture of m-cresol and solvent naphtha (weight ratio: 8:2) at 80° C. to produce enamels having a concentration of 15%. Self-bonding magnet wires were produced in the same manner as in Example 1 using the resulting enamels.

Comparative Examples 6 to 8

Copolyamide (I) and Copolyamide (IV) were mixed in a weight ratio of 30:70, 50:50 and 70:30 and dissolved in a mixture of m-cresol and p-cresol (weight ratio: 7:3) at 80° C. to produce solutions having a concentration of 16%. These solutions were each diluted with xylene to produce enamels having a concentration of 13%. Self-bonding magnet wires were produced in the same manner as in Example 9 using the resulting enamels.

Each of the self-bonding magnet wires obtained in Examples 1 to 8 and Comparative Examples 1 to 5 was wound tightly around a mandrel having a diameter of 5.0 mm to produce a helical coil having a length of 70 mm. The wires were bonded under a load of 125 g under specified bonding conditions to produce samples.

The bond strengths of these wires were measured in accordance with ASTM-D2519. The results obtained are shown in Table 1 below.

was coated and baked, and the object on the right hand side is the glass on which the enamel obtained in Comparative Example 2 was coated and baked.

Table 1

|  | Example | | | | | | | | Comparative Example | | | | |
|---|---|---|---|---|---|---|---|---|---|---|---|---|---|
|  | 1 | 2 | 3 | 4 | 5 | 6 | 7 | 8 | 1 | 2 | 3 | 4 | 5 |
| Copolyamide (I) | 240 | 160 | 120 | 200 | 320 | 120 | 160 | — | — | 160 | 120 | 200 | 320 |
| (II) | 160 | 240 | 280 | 200 | 80 | 160 | 160 | — | — | 240 | 280 | 200 | 80 |
| (III) | — | — | — | — | — | 120 | — | 200 | — | — | — | — | — |
| (IV) | — | — | — | — | — | — | 80 | — | — | — | — | — | — |
| (V) | — | — | — | — | — | — | — | 200 | — | — | — | — | — |
| Polyvinyl butyral | — | — | — | — | — | — | — | — | 300 | — | — | — | — |
| Bonding Temperature (°C.) (10 min.) | 160 | 150 | 150 | 150 | 160 | 160 | 150 | 150 | 160 | 160 | 160 | 160 | 160 |
| Bond Strength after Bonding | | | | | | | | | | | | | |
| Measured at Room Temperature [kg] | 4.6 | 4.0 | 3.9 | 4.4 | 4.8 | 4.4 | 4.5 | 4.2 | 5.7 | 3.9 | 4.0 | 4.2 | 4.5 |
| Measured at 130° C. [g] | 580 | 410 | 380 | 420 | 540 | 460 | 520 | 400 | 40 | 400 | 350 | 380 | 480 |
| Appearance of Wires | Good | Good | Good | Good | Good | Good | Good | Good | Good | Poor | Poor | Poor | Fair |
| Concentration of Enamel [%] | 17 | 17 | 17 | 17 | 17 | 16 | 16 | 16 | 15 | 15 | 15 | 15 | 15 |
| Viscosity of Enamel [cps] | 1640 | 1370 | 1260 | 1520 | 1830 | 1810 | 1760 | 1160 | 8200 | 4500 | 5820 | 6410 | 7250 |

The appearances of the wires shown in Table 1 was evaluated using the following scale.
Good: Uniformly transparent and a smooth surface condition free from raised and depressed portions, peeling, specks, etc.
Poor: A non-uniform and opaque surface condition with raised and depressed portions, peeling, specks, etc.
Fair: A surface condition intermediate between "Good" and "Poor"

The self-bonding magnet wires of this invention exhibited sufficient bondability even when heated at 150° to 160° C. for 10 minutes. The self-bonding magnet wires of this invention also showed a sufficiently high bond strength even at 130° C. In addition, they had a very good appearance with no imperfections such as raised and depressed portions, peeling and unevenness in color as compared with conventional self-bonding magnet wires.

Figure 1:
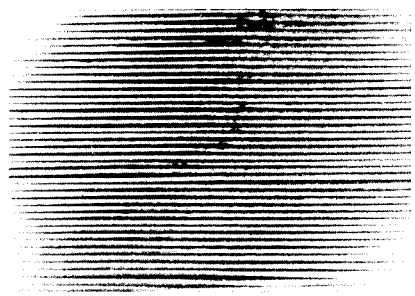
FIG. 1 is a photograph (magnification 2.5×) of the surface of a coil made of the self-bonding magnet wire produced in Example 2, in which the individual lines (white) extending in the horizontal direction of the photograph are the wires.
Figure 2:
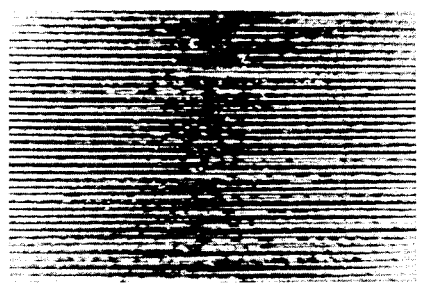
FIG. 2 is a photograph (magnification 2.5×) of the surface of a coil made of the self-bonding magnet wire produced in Comparative Example 2, in which the individual lines extending in the horizontal direction of the photograph are the wires and the portions where the color is uneven are the spaces between the wires.
Figure 3:
FIG. 3 is a photograph (magnification 60×) of the surface of the self-bonding magnet wire produced in Example 2.

FIGS. 1 to 4 of the accompanying drawings show the appearances of the self-bonding magnet wires obtained in Example 2 and Comparative Example 2. It can be seen from these photographs that the self-bonding magnet wire of the invention (FIGS. 1 and 3) had a very smooth appearance without raised or depressed portions, peeling, unevenness in color, etc. as compared with the conventional self-bonding magnet wire (FIGS. 2 and 4).

Deflection yoke coils for television sets which were produced using the self-bonding magnet wires of this invention which has a very smooth surface without raised and depressed portions, peeling, unevenness in color, etc. are not deteriorated during winding, sufficiently adhere to every portion even when complicated shapes are employed, and do not cause color shearing, poor focusing, etc. to occur, etc.

The enamels obtained in Example 2 and Comparative Example 2 were each coated on transparent glass plates, and baked at 200° C. for 2 hours. The resulting resin films are shown in FIG. 5. FIG. 5 is a photograph taken from above the resin films formed on the glass plates placed on black frames. The object on the left hand side is the glass on which the enamel obtained in Example 2

The enamels used to produce the self-bonding magnet wire of this invention formed uniform transparent films since after coating and baking, the resins had good compatibility, and as shown in FIG. 5, the contour of the figure drawn under the leftside glass plate can be clearly and distinctly seen. The conventional enamels formed non-uniform, opaque and uneven films because the resins after coating and baking were not compatible. Hence, the contour of the figure drawn under the right side glass plate appears dim.

Thus, the self-bonding magnet wires of this invention form uniform and clear films free from a rough surface such as raised and depressed portions and peeling, specks, unevenness in color, etc. as compared with the conventional self-bonding magnet wires. Hence, the wire had improved resistance to deterioration during processing, and coils obtained by winding such wires do not have spaces among the wires, and a good space factor results. The flow of the resin becomes uniform, and after bonding, the resins exhibit sufficient bond strength to every part of a coil of a complicated shape such as a deflection yoke coil for television sets. Thus, a coil which does not cause color shearing, poor focusing, etc. to occur can be provided. All this can be concluded from the compatibility, transparency, uniformity, etc. of a resin film coated and baked on a glass plate.

The appearances of the self-bonding magnet wires obtained in Examples 1 to 11 and Comparative Examples 2 to 8, and the compatibilities and transparencies of the resin films obtained by coating the enamels used on glass plates and baking the coatings at 200° C. for 2 hours were examined, and the results obtained are shown in Table 2.

Table 2

|  | Example | | | | | | | | | | |
|---|---|---|---|---|---|---|---|---|---|---|---|
|  | 1 | 2 | 3 | 4 | 5 | 6 | 7 | 8 | 9 | 10 | 11 |
| Compolyamide (1) | 40* | 60 | 30 | 50 | 70 | 30 | 40 | — | 30 | 50 | 70 |
| Compolyamide (II) | 60 | 40 | 70 | 50 | 30 | 40 | 40 | — | — | — | — |
| Copolyamide(III) | — | — | — | — | — | 30 | — | 50 | — | — | — |
| Compolyamide (IV) | — | — | — | — | — | — | 20 | — | 70 | 50 | 30 |
| Compolyamide (V) | — | — | — | — | — | — | — | 50 | — | — | — |
| Apperance of Wires** | Good | Good | Good | Good | Good | Good | Good | Good | Good | Good | Good |
| Appearance of Resin Film Baked on Glass Plate | Good | Good | Good | Good | Good | Good | Good | Good | Good | Good | Good |

Table 2-continued

|  | Comparative Example | | | | | | |
| --- | --- | --- | --- | --- | --- | --- | --- |
|  | 2 | 3 | 4 | 5 | 6 | 7 | 8 |
| Compolyamide (I) | 40 | 30 | 50 | 80 | 30 | 50 | 70 |
| Compolyamide (II) | 60 | 70 | 50 | 20 | — | — | — |
| Compolyamide (III) | — | — | — | — | — | — | — |
| Compolyamide (IV) | — | — | — | — | 70 | 50 | 30 |
| Compolyamide (V) | — | — | — | — | — | — | — |
| Appearance of Wires** | Poor | Poor | Poor | Fair | Poor | Poor | Poor |
| Appearance of Resin Film Baked on Glass Plate | Poor | Fair | Poor | Fair | Poor | Poor | Poor |

*Mixing ratio of resins
**Same evaluation as in Table 1.

The self-bonding magnet wires of this invention had a very superior appearance free from raised and depressed portions, peeling, etc. as compared with the conventional self-bonding magnet wires. This correlated well with the fact that the resins obtained by coating and baking the enamels used in this invention form films having superior resin compatibility and transparency.

While the invention has been described in detail and with reference to specific embodiments thereof, it will be apparent to one skilled in the art that various changes and modifications can be made therein without departing from the spirit and scope thereof.

What is claimed is:

1. A self-bonding magnet wire comprising an electrical conductor having directly thereon or on an electrical insulation layer thereon a coated and baked layer of an enamel comprising a polymer solution containing the reaction product obtained on heating to at least 120° C. two or more copolyamides, at least one of which is a copolyamide having a nylon-12 unit in the molecule thereof, in a solvent containing at least one compound with a phenolic hydroxyl group in the molecule thereof.

2. The self-bonding magnet wire of claim 1, wherein the copolyamide containing a nylon-12 unit in the molecule thereof is a copolyamide of nylon-12 and nylon-6.

3. The self-bonding magnet wire of claim 1, wherein the copolyamide containing a nylon-12 unit in the molecule thereof is a copolyamide of nylon-12, nylon-6 and nylon-6,6.

4. The self-bonding magnet wire of claim 1, wherein the copolyamide containing a nylon-12 unit in the molecule thereof is a copolyamide of nylon-12, nylon-6 and nylon-6,10.

5. The self-bonding magnet wire of claim 1, wherein said two or more copolyamides are all copolyamides containing a nylon-12 unit in the molecules thereof.

6. The self-bonding magnet wire of claim 1, 2, 3 or 4, wherein said two or more copolyamides comprise at least one copolyamide containing a nylon-12 unit in the molecule thereof and a copolyamide of nylon-6, nylon-6,6 and nylon-6,10.

7. The self-bonding magnet wire of claim 1 or 5, wherein said two or more copolyamides comprise (i) a copolyamide of nylon-12 and nylon-6 and a copolyamide of nylon-12, nylon-6 and nylon-6,6; (ii) a copolyamide of nylon-12 and nylon-6 and a copolyamide of nylon-12, nylon-6 and nylon-6,10; (iii) a copolyamide of nylon-12 and nylon-6 and a copolyamide of nylon-12, nylon-6 and nylon-6,6 and a copolyamide of nylon-12, nylon-6 and nylon-6,10.

8. The self-bonding magnet wire of claim 1, 2, 3, 4 or 5, wherein in each copolyamide having a nylon-12 unit in the molecule thereof, the proportion of the nylon-12 unit is about 20 to about 90% by weight.

9. The self-bonding magnet wire of claim 1, 2, 3, 4 or 5, wherein in each copolyamide having a nylon-12 unit in the molecule thereof, the proportion of the nylon-12 unit is 25 to 85% by weight.

10. The self-bonding magnet wire of claim 1 or 5, wherein the amount of the copolyamide present in the largest proportion of said two or more copolyamides is present in an amount of about 90% by weight or less.

11. The self-bonding magnet wire of claim 1 or 5, wherein the amount of the copolyamide present in the largest proportion of said two or more copolyamides is present in an amount of 80% by weight or less.

12. The self-bonding magnet wire of claim 1 or 5, wherein the amount of the copolyamide present in the largest proportion of said two or more copolyamides is present in an amount of 70% by weight or less.

13. The self-bonding magnet wire of claim 1 or 5, wherein the compound containing a phenolic hydroxyl group in the molecule thereof is phenol, o-cresol, m-cresol, p-cresol, 2,3-xylenol, 2,4-xylenol, 2,5-xylenol, 2,6-xylenol, 3,4-xylenol, 3,5-xylenol or a mixture thereof.

14. The self-bonding magnet wire of claim 1 or 5, wherein said self-bonding magnetic wire comprises said conductor, an electrical insulation layer wholly or partly of a thermally stable polymer selected from the group consisting of a polyesterimide, a polyesterimideurethane, a polyesteramideimide, a polyesteramideimideurethane, a polyhydantoinesterimide, a polyhydantoin, a polyamideimide and a polyimide and said coated and baked layer of said enamel.

15. A coil of the self-bonding magnet wire of claim 1.

16. A deflection yoke coil for a television set comprising the coil of claim 15.

* * * * *